T. J. BAXTER.
WEED TURNING ATTACHMENT FOR PLOWS.
APPLICATION FILED APR. 3, 1909.
941,298.
Patented Nov. 23, 1909.
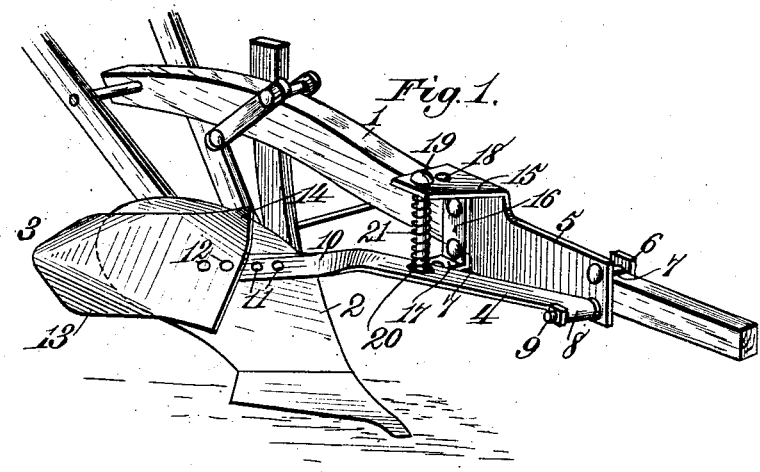
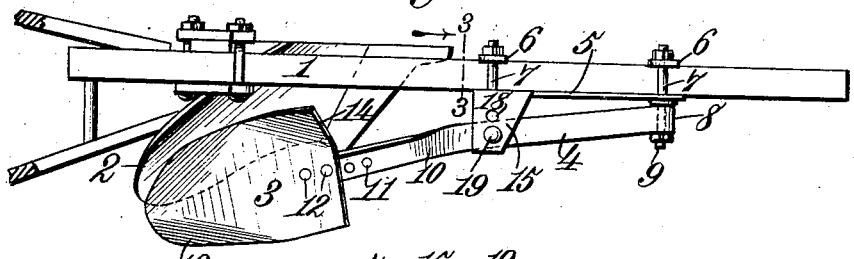
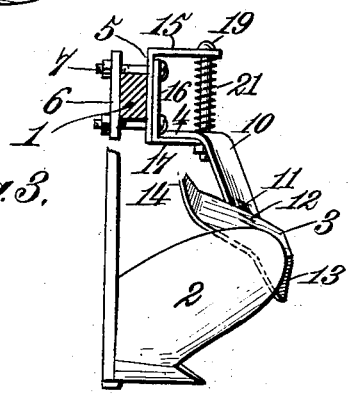
Witnesses.
Robert Everett
Inventor:
Thomas J. Baxter,
By
James L. Norris
Att'y.

UNITED STATES PATENT OFFICE.

THOMAS J. BAXTER, OF BOBBIN, TEXAS.

WEED-TURNING ATTACHMENT FOR PLOWS.

941,298.　　　　Specification of Letters Patent.　　Patented Nov. 23, 1909.

Application filed April 3, 1909. Serial No. 487,658.

*To all whom it may concern:*

Be it known that I, THOMAS J. BAXTER, a citizen of the United States, residing at Bobbin, in the county of Montgomery and State of Texas, have invented new and useful Improvements in Weed-Turning Attachments for Plows, of which the following is a specification.

This invention relates to new and useful improvements in weed turning attachments for plows and it relates more particularly to a structure of that general type, in which an angularly disposed blade is arranged to travel in the furrow previously made by the plow, and to turn the weeds and stubble in order that they will be covered with the earth which is turned from the furrow.

In connection with a structure of the above general type, the invention aims as a primary object to provide a weed turning attachment which shall be self-adjusting to compensate for variations in the degree of growth of the weeds. Accordingly, the invention comprises more particularly a weed turning blade which is carried upon a pivoted arm, and spring means acting to force the arm downwardly. The blade and the arm are, however, capable of yielding automatically under pressure, as when an obstacle is encountered or when weeds of a different degree of growth are alongside of the furrow.

The invention aims as a further object to provide a device of the character stated, which may be readily attached to any well known standard form of plow, which shall be simple in its structural details and inexpensive to manufacture, as well as readily set up and dismantled.

In the accompanying drawings I have illustrated a preferred and advantageous embodiment of the invention, the structural details of which will be set forth at length in the following description, while the novel features by which the invention is distinguished from the prior art will be recited in the claim appended at the end of the description.

In the said drawings: Figure 1 is a perspective view illustrating the application of the attachment to a plow of standard form. Fig. 2 is a top plan view thereof, and Fig. 3 is a vertical transverse section on the line 3—3 of Fig. 2.

The attachment is shown as applied to a plow of standard form, which comprises a beam, as 1, from which the plow blade 2 is hung in a suitable manner, the major portion of said beam projecting in advance of the plow blade.

The present attachment is assembled upon the forwardly projecting portion of the beam 1 and comprises essentially a weed turning blade, as 3, an arm, as 4, which carries the blade 3 and a plate, as 5, to which the arm 4 is pivoted. The plate 5 is located at one side of the forwardly projecting portion of the beam, parallel to the adjacent side face thereof and is held in position by suitable clamp devices comprising plates, as 6, which are located at the other side of the beam and which are connected to the plate 5 by bolts, as 7. The plate 5 may thus be readily attached to and detached from the beam and by loosening the nuts on the ends of the bolts 7 may be readily slid axially of the beam.

The arm 4 comprises a flat horizontally disposed strip of metal which terminates at its front end in a loop, as 8. The loop 8 loosely surrounds a pivot bolt 9 which projects laterally from the plate 5. The arm 4 extends rearwardly and divergently with respect to the beam 1 and terminates in an angularly off-set portion, as 10, to which the blade 3 is secured. The portion 10 is formed with a series of apertures 11 and the blade 3 is secured by screws or other suitable fastenings, as 12, which are engaged in the apertures 11. It will be understood that the blade may be adjustably positioned on the portion 10 by engaging the fastenings 12 in any desired apertures 11, in accordance with the location proposed for said blade.

The blade 3 is disposed in a substantially oblique plane as best shown in Fig. 3 and has at its outer side an angularly and downwardly turned lip as 13 and at its inner side and at its forward end an angularly and upwardly turned lip, as 14. The angular disposition of the blade 3 in connection with the particular construction thereof, that is to say, in connection with the lips 13 and 14, causes all the stubble and weeds in advance of the landside portion of the plow blade, to be turned in such manner that they will be covered with the earth which is turned from the furrow by said landside portion.

The plate 5 has at its rear end and projecting from its upper edge a laterally bent flange, as 15. Below the flange 15 an L-shaped member, as 16, is secured, the member 16 being preferably held by the rear pair of bolts 7 which connect the plate 5 and the rear plate 6. The member 16 has at its lower end a horizontally projecting portion, as 17, which is disposed directly below the flange 15 and is coincident therewith in a vertical line. The flange 15 and the portion 17 are formed with a number of alining openings, as 18, through any corresponding pair of which a bolt 19 is passed, the said bolt being secured by a nut. The bolt 19 also passes through a slot, as 20, in the arm 4 and provides for the assemblage of an expansive coil spring, as 21, which surrounds said bolt and is interposed between the flange 15 and the arm 4, normally forcing the latter downwardly against the portion 17 but permitting of the pivotal yielding of said arm when the blade 3 encounters an obstacle or high weeds or stubble.

The provision of a plurality of apertures 11 permits of the blade 3 being adjusted longitudinally of the plow blade and the provision of a plurality of apertures 18 permits of the arm 4 being adjusted laterally with respect to the beam 1 and thereby the adjustment of the blade 3 laterally with respect to the plow blade. It will be understood that the loop 8 is of sufficiently large diameter to have a certain degree of play upon the bolt 9 in order that this lateral adjustment of the arm 4 may be provided for.

From the foregoing, it will be seen that the attachment can be applied to any plow of standard form by simply securing the plate 5 upon the forward portion of the beam of such plow and that it may be readily set up and removed. It will also be seen that the attachment as an entirety may be placed at any desired position on the beam and may be adjusted axially thereof by simply loosening the nuts on the bolt 7 and without removing the attachment. It will also be seen that the blade 3 may be set at any desired position laterally and longitudinally with respect to the plow blade, without affecting the assemblage of the attachment. The particular form and arrangement of the blade 3 assures of the efficient action thereof in engaging and turning the weeds or stubble and the mounting of the arm 4 assures of a certain degree of yielding movement thereof, under necessary conditions, which yielding movement is prevented from being too free, by reason of the provision of the spring 21.

Having fully described my invention, I claim:—

In a weed turning attachment for plows, the combination with a plow beam and a plow blade, of a plate arranged at one side of the beam, clamping plates at the other side of the beam, bolts connecting the clamping plates and the first named plate and providing for the adjustment of the latter axially of the beam, a bolt projecting laterally from the front end of the plate, a pair of laterally projecting flanges at the rear end of the plate, an arm pivoted on the bolt and projecting rearwardly between the flanges, a weed turning blade secured at the rear end of the arm, a bolt passed through the flanges and through the arm, and a spring bearing against the arm.

In testimony whereof I have hereunto set my hand in presence of two subscribing witnesses.

THOMAS J. BAXTER.

Witnesses:
J. M. STINSON,
GIFFORD SMYTH.